(12) United States Patent
Song et al.

(10) Patent No.: US 12,463,953 B2
(45) Date of Patent: Nov. 4, 2025

(54) CLOUD SERVER FOR AUTHENTICATION USER AND OPERATING METHOD THEREOF

(71) Applicant: SAMSUNG ELECTRONICS CO., LTD., Suwon-si (KR)

(72) Inventors: Sungyoon Song, Suwon-si (KR); Hyungseok Shim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 206 days.

(21) Appl. No.: 18/216,973

(22) Filed: Jun. 30, 2023

(65) Prior Publication Data

US 2023/0362149 A1    Nov. 9, 2023

Related U.S. Application Data

(63) Continuation of application No. PCT/KR2022/016235, filed on Oct. 24, 2022.

(30) Foreign Application Priority Data

Dec. 8, 2021 (KR) .......... 10-2021-0174808
Dec. 23, 2021 (KR) .......... 10-2021-0186062

(51) Int. Cl.
    *H04L 9/40* (2022.01)
(52) U.S. Cl.
    CPC .................. *H04L 63/08* (2013.01)
(58) Field of Classification Search
    CPC . H04L 63/08; H04L 9/40; G06F 21/31; G06F 21/45
    See application file for complete search history.

(56) References Cited

U.S. PATENT DOCUMENTS 8,776,195 B1 * 7/2014 Avni .............. G06F 21/31
                                           713/168
8,850,537 B1 * 9/2014 Dotan ............ H04L 63/08
                                           726/6

(Continued)

FOREIGN PATENT DOCUMENTS

CN    107026819 A    8/2017
CN    110532741 A    12/2019

(Continued)

OTHER PUBLICATIONS

International Search Report for International Application No. PCT/KR2022/016235; International Filing Date Oct. 24, 2022; Date of Mailing Jan. 30, 2023; 3 Pages.

*Primary Examiner* — Aravind K Moorthy
(74) *Attorney, Agent, or Firm* — CANTOR COLBURN LLP

(57) ABSTRACT

To authenticate account information received from an electronic device, a cloud server receives the account information to be authenticated and a request for the authentication from the electronic device; obtains authentication information for user authentication from user data corresponding to the account information; obtains correct answer data and incorrect answer data based on the authentication information; generates first problem information including first question information and first option information for the user authentication based on the correct answer data and the incorrect answer data and transmits the first problem information to the electronic device; receives a user input in response to the first option information from the electronic device; and determines whether the authentication is successful based on whether the user input corresponds to a correct answer.

15 Claims, 11 Drawing Sheets

(56) References Cited

U.S. PATENT DOCUMENTS

| | | | |
|---|---|---|---|
| 8,955,066 B1* | 2/2015 | Ackerman | G06F 21/316 726/5 |
| 9,014,666 B2* | 4/2015 | Bentley | H04L 63/08 455/411 |
| 9,092,599 B1* | 7/2015 | Kronrod | G06F 21/45 |
| 9,131,374 B1* | 9/2015 | Avni | H04W 12/30 |
| 9,152,775 B1* | 10/2015 | Kronrod | G06F 21/31 |
| 9,177,127 B1* | 11/2015 | Dotan | G06N 99/00 |
| 9,202,173 B1* | 12/2015 | Dotan | G06N 5/04 |
| 9,223,950 B2 | 12/2015 | Li et al. | |
| 9,398,143 B1* | 7/2016 | Fullmer | H04L 63/0861 |
| 9,497,312 B1* | 11/2016 | Johansson | H04M 1/724631 |
| 9,514,407 B1* | 12/2016 | Dotan | G06N 5/022 |
| 9,565,562 B1* | 2/2017 | Bar-Menachem | H04W 12/065 |
| 9,633,322 B1* | 4/2017 | Burger | G06Q 20/4014 |
| 9,674,177 B1* | 6/2017 | Nyström | H04L 63/083 |
| 9,674,195 B1* | 6/2017 | Jiang | H04L 61/256 |
| 9,706,406 B1* | 7/2017 | Adams | G06F 21/32 |
| 9,754,209 B1* | 9/2017 | Kronrod | G06F 21/31 |
| 9,767,263 B1* | 9/2017 | McInerny | G06F 21/31 |
| 9,813,402 B1* | 11/2017 | Chen | H04L 63/08 |
| 9,817,958 B1* | 11/2017 | McCorkendale | H04L 63/20 |
| 9,888,377 B1* | 2/2018 | McCorkendale | H04W 12/06 |
| 10,034,174 B1* | 7/2018 | Tuomikoski | H04L 63/0861 |
| 10,089,450 B2 | 10/2018 | Zhai | |
| 10,216,943 B2* | 2/2019 | Krishna | H04L 63/10 |
| 10,255,558 B1* | 4/2019 | Kronrod | G06F 21/45 |
| 10,257,181 B1* | 4/2019 | Sherif | G06F 21/45 |
| 10,339,527 B1* | 7/2019 | Coleman | G06Q 40/123 |
| 10,404,697 B1* | 9/2019 | Jiang | H04L 63/0876 |
| 10,462,113 B1* | 10/2019 | Venkataramani | H04L 9/0825 |
| 10,771,965 B1* | 9/2020 | Koss | H04L 63/0861 |
| 10,812,478 B1* | 10/2020 | Davis | G06F 21/40 |
| 11,211,140 B1* | 12/2021 | Satpathy | G06F 21/31 |
| 11,271,929 B1* | 3/2022 | McFarland | H04W 12/08 |
| 11,301,630 B1* | 4/2022 | Markson | G06F 40/30 |
| 11,533,318 B1* | 12/2022 | Osterkamp | H04L 63/102 |
| 11,785,007 B2* | 10/2023 | Chaudhary | H04L 63/0876 726/4 |
| 11,870,857 B1* | 1/2024 | Padmanabhan | G06F 3/067 |
| 11,995,175 B2* | 5/2024 | Maiman | G06F 21/45 |
| 12,067,637 B1* | 8/2024 | Ravi | G06Q 50/265 |
| 2007/0005967 A1* | 1/2007 | Mister | G06Q 10/107 713/168 |
| 2007/0078668 A1* | 4/2007 | Pathria | G06Q 90/00 705/325 |
| 2007/0101010 A1* | 5/2007 | Ellison | H04L 51/212 709/225 |
| 2008/0288299 A1* | 11/2008 | Schultz | G06Q 30/06 705/26.1 |
| 2009/0241201 A1* | 9/2009 | Wootton | G06F 21/31 726/28 |
| 2009/0265773 A1* | 10/2009 | Schultz | G06F 16/9535 726/7 |
| 2009/0305670 A1* | 12/2009 | DeBoer | G06Q 20/40 455/411 |
| 2009/0328175 A1* | 12/2009 | Shuster | H04L 9/3226 726/7 |
| 2010/0229223 A1* | 9/2010 | Shepard | H04L 63/083 726/5 |
| 2010/0293608 A1* | 11/2010 | Schechter | H04L 9/3218 726/8 |
| 2012/0136678 A1* | 5/2012 | Steinberg | G06Q 30/02 705/3 |
| 2012/0214442 A1* | 8/2012 | Crawford | G06F 21/316 455/411 |
| 2012/0216260 A1* | 8/2012 | Crawford | G06F 21/31 726/5 |
| 2013/0036342 A1* | 2/2013 | Deo | G06Q 30/02 715/202 |
| 2013/0183937 A1* | 7/2013 | Neal | H04W 12/12 455/411 |
| 2014/0189829 A1* | 7/2014 | McLachlan et al. | G06Q 20/4014 726/6 |
| 2015/0128240 A1* | 5/2015 | Richards | H04W 12/068 726/7 |
| 2015/0150104 A1* | 5/2015 | Melzer | G06N 20/00 726/7 |
| 2016/0036807 A1* | 2/2016 | Knauss | H04L 63/0838 726/7 |
| 2016/0092671 A1* | 3/2016 | Andreeva | G06F 21/46 726/6 |
| 2016/0315929 A1* | 10/2016 | Childress | H04L 63/0853 |
| 2017/0053280 A1* | 2/2017 | Lishok | G06Q 20/3224 |
| 2017/0187709 A1* | 6/2017 | Rotem | G06F 21/31 |
| 2017/0289168 A1* | 10/2017 | Bar | H04L 63/1408 |
| 2017/0310698 A1* | 10/2017 | Klemm | H04L 63/083 |
| 2018/0007087 A1* | 1/2018 | Grady | H04L 63/083 |
| 2018/0046785 A1* | 2/2018 | Anderson | G06F 21/31 |
| 2018/0165344 A1* | 6/2018 | Williams | G06F 21/31 |
| 2018/0205727 A1* | 7/2018 | Hwang | H04L 63/08 |
| 2018/0301050 A1* | 10/2018 | Afzal | G09B 7/02 |
| 2018/0350257 A1* | 12/2018 | Picard | G06F 3/013 |
| 2018/0367526 A1* | 12/2018 | Huang | H04L 63/0807 |
| 2019/0095596 A1* | 3/2019 | Manganelli | G06F 21/32 |
| 2019/0171284 A1* | 6/2019 | Contractor | G09B 5/02 |
| 2019/0297071 A1* | 9/2019 | Canavor | G06F 21/45 |
| 2019/0325449 A1* | 10/2019 | Krishnamurthy | G06F 21/44 |
| 2020/0026838 A1 | 1/2020 | Choi et al. | |
| 2020/0110868 A1* | 4/2020 | Varanjani | G06F 21/31 |
| 2020/0175148 A1* | 6/2020 | Toor | H04L 67/01 |
| 2020/0322335 A1* | 10/2020 | Vbh | H04L 63/0884 |
| 2020/0382327 A1* | 12/2020 | Mokhasi | G06Q 20/202 |
| 2021/0049476 A1* | 2/2021 | Davis | G06N 5/02 |
| 2021/0105261 A1* | 4/2021 | Volcoff | H04L 63/20 |
| 2021/0144106 A1* | 5/2021 | Chen | G06F 40/35 |
| 2021/0297422 A1* | 9/2021 | McDorman | H04L 63/107 |
| 2021/0319527 A1* | 10/2021 | Benkreira | G06Q 50/265 |
| 2021/0326428 A1* | 10/2021 | Edwards | G06T 19/006 |
| 2021/0357884 A1* | 11/2021 | Edwards | G06Q 20/10 |
| 2021/0392133 A1* | 12/2021 | Kim | G06N 20/00 |
| 2021/0397696 A1* | 12/2021 | Yarabolu | G06F 21/554 |
| 2021/0409389 A1* | 12/2021 | Benkreira | H04L 69/22 |
| 2022/0012316 A1* | 1/2022 | Yarabolu | G10L 17/04 |
| 2022/0092168 A1* | 3/2022 | Brown | H04L 63/126 |
| 2022/0141303 A1* | 5/2022 | Edwards | H04L 67/141 709/227 |
| 2022/0188389 A1* | 6/2022 | Benkreira | G06F 21/40 |
| 2022/0284086 A1* | 9/2022 | Lin | G06F 21/32 |
| 2022/0335426 A1* | 10/2022 | Rapowitz | G06N 20/00 |
| 2022/0360579 A1* | 11/2022 | Chaudhary | G06F 18/214 |
| 2022/0414190 A1* | 12/2022 | Edwards | G06Q 20/388 |
| 2022/0414652 A1* | 12/2022 | Edwards | G06Q 20/40 |
| 2023/0004972 A1* | 1/2023 | Rapowitz | G06Q 20/4014 |
| 2023/0033368 A1* | 2/2023 | Miller | H04L 63/083 |
| 2023/0035919 A1* | 2/2023 | Castinado | G06F 16/2379 |
| 2023/0098536 A1* | 3/2023 | Zheng | G06F 21/6209 726/19 |
| 2023/0162482 A1* | 5/2023 | Ito | G06N 20/00 382/155 |
| 2023/0177506 A1* | 6/2023 | Maiman | G06Q 20/308 705/44 |
| 2024/0378527 A1* | 11/2024 | Kalele | G06F 3/0482 |

FOREIGN PATENT DOCUMENTS

| | | |
|---|---|---|
| JP | 2013242661 A | 12/2013 |
| JP | 2018147053 A | 9/2018 |
| KR | 20140105073 A | 9/2014 |
| KR | 20150105395 A | 9/2015 |
| KR | 101712742 B1 | 3/2017 |
| KR | 20200010041 A | 1/2020 |

* cited by examiner

CLOUD SERVER FOR AUTHENTICATION USER AND OPERATING METHOD THEREOF

CROSS-REFERENCE TO RELATED APPLICATIONS

This application is a PCT-Bypass application of international application number PCT/KR2022/01623, filed on Oct. 24, 2022, which claims priority to a Korean patent application number 10-2021-0174808 filed on Dec. 8, 2021, a Korean patent application number 10-2021-0186062 filed on Dec. 23, 2021, and all the benefits accruing therefrom under 35 U.S.C. § 119, the content of which in their entirety is herein incorporated by reference.

BACKGROUND

1. Field

The disclosure relates to a cloud server performing user authentication and an operating method of the cloud server.

2. Description of Related Art

Recent electronic devices may provide various user functions and communicate with other external electronic devices over networks. As electronic devices advance further, the demand for cloud computing is increasing. Cloud computing has enabled users to store information in a server on the Internet and access the server for the information stored in the server through electronic devices to use the information anytime and anywhere. The increase in the demand for cloud computing has accelerated the development of various applications using cloud computing.

SUMMARY

Personal authentication is useful for various online services to provide security, and two-factor authentication using various methods has recently been proposed to increase security further.

The methods for two-factor authentication may include, for example, one-time password (OTP)-based authentication and biometric authentication. The OTP-based authentication may use an additional device for authentication, while the biometric authentication may use an additional sensor.

According to an aspect of various embodiments of the present disclosure, an operating method of a cloud server includes: receiving, from an electronic device, account information on which authentication is to be performed and a request for the authentication; obtaining authentication information for user authentication from user data corresponding to the account information; obtaining correct answer data and incorrect answer data based on the authentication information; generating first problem information including first question information and first option information for the user authentication based on the correct answer data and the incorrect answer data, and transmitting the first problem information to the electronic device; receiving, from the electronic device, a user input in response to the first option information; and determining whether the authentication is successful based on whether the user input corresponds to a correct answer.

According to another aspect of various embodiments of the present disclosure, a server for user authentication includes: a communication module configured to communicate with an electronic device; a memory storing therein a database (DB) storing user data, and computer-executable instructions; and a processor configured to execute the instructions by accessing the memory. When executed by the processor, the instructions are configured to cause the server to: receive, from the electronic device, account information on which authentication is to be performed and a request for the authentication; obtain authentication information for user authentication from the user data corresponding to the account information stored in the DB; obtain correct answer data and incorrect answer data based on the authentication information; generate first problem information including first question information and first option information for the user authentication based on the correct answer data and the incorrect answer data, and transmit the first problem information to the electronic device; receive, from the electronic device, a user input in response to the first option information; and determine whether the authentication is successful based on whether the user input corresponds to a correct answer.

According to still another aspect of various embodiments of the present disclosure, an electronic device includes: a communication module configured to communicate with a cloud server for user authentication; a memory storing therein computer-executable instructions; and a processor configured to execute the instructions by accessing the memory. When executed by the processor, the instructions are configured to cause the electronic device to: transmit, to the cloud server, account information on which authentication is to be performed and a request for the authentication, based on login; receive, from the cloud server, first problem information including first question information and first option information for user authentication; and receive, from the cloud server, a result of whether the authentication is successful after transmitting, to the cloud server, a user input in response to the first option information.

According to yet another aspect of various embodiments of the present disclosure, an electronic device includes: a communication module configured to communicate with a cloud server for user authentication; a memory configured to store therein computer-executable instructions; and a processor configured to execute the instructions by accessing the memory. When executed by the processor, the instructions are configured to the electronic device to: transmit, to the cloud server, account information on which authentication is to be performed and a request for the authentication, based on login; obtain authentication information for user authentication by receiving user data corresponding to the account information from the cloud server; obtain correct answer data and incorrect answer data based on the authentication information; generate first problem information including first question information and first option information for the user authentication based on the correct answer data and the incorrect answer data; receive a user input in response to the first option information by displaying the first problem information; and determine whether the authentication is successful based on whether the user input corresponds to a correct answer.

However, technical aspects of the present disclosure are not limited to the foregoing aspects, and other technical aspects may also be present. Additional aspects of the disclosure ware set forth in part in the description which follows and, in part, are apparent from the description, or may be learned by practice of the presented embodiments of the disclosure.

According to various embodiments of the present disclosure, an electronic device and a cloud server may perform user authentication using personal data stored in a cloud.

According to various embodiments of the present disclosure, when a user fails to provide a correct answer, a cloud server may provide again an opportunity for authentication by adjusting a difficulty level until the number of times the user fails to provide the correct answer reaches a threshold number of times.

Other features and aspects will be apparent from the following detailed description, the drawings, and the claims.

BRIEF DESCRIPTION OF THE DRAWINGS

The above and other features of certain embodiments of the present disclosure will be more apparent from the following detailed description, taken in conjunction with the accompanying drawings, in which.

DETAILED DESCRIPTION

Figure 1:
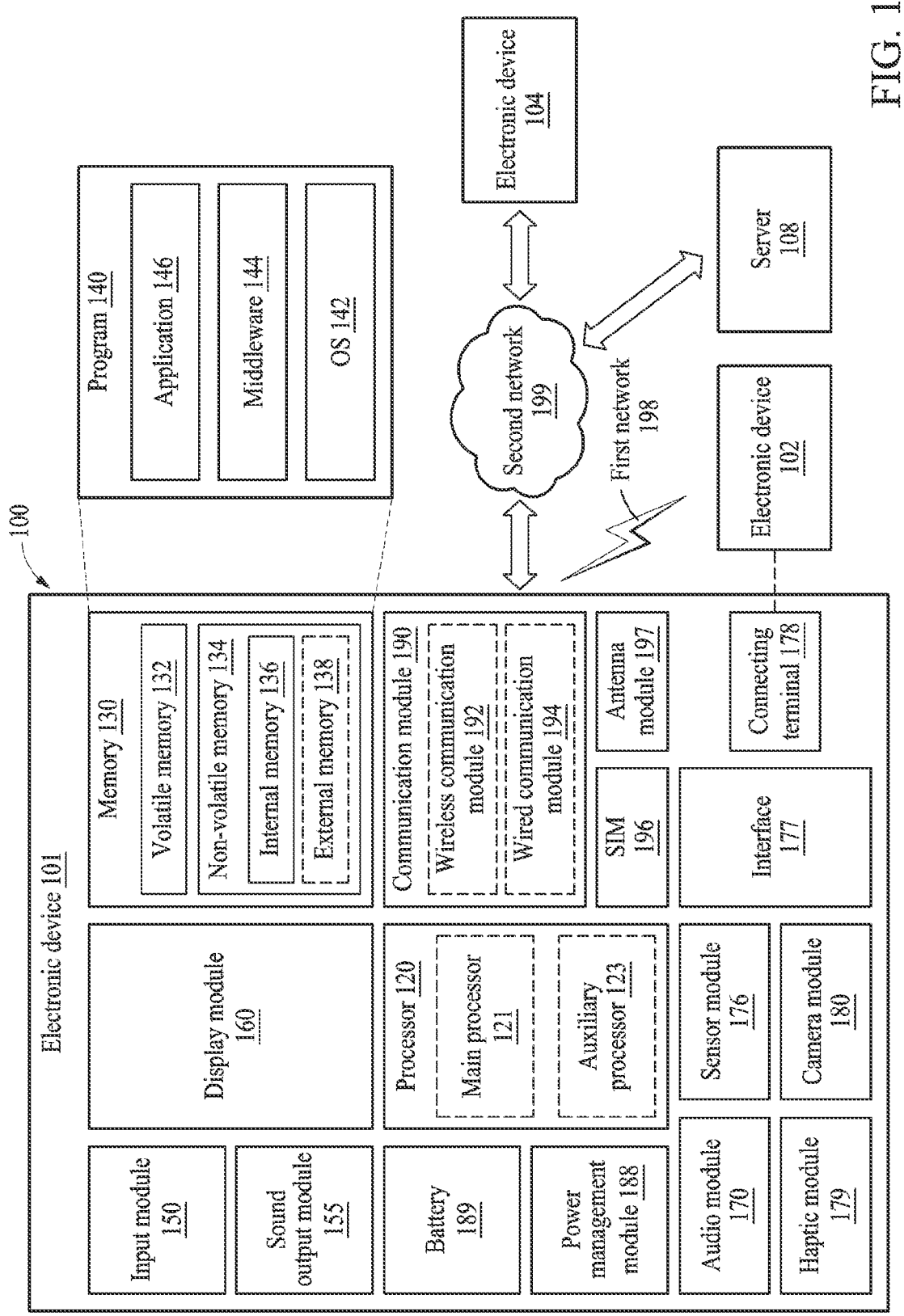
FIG. 1 is a block diagram illustrating an electronic device in a network environment according to an embodiment.

Hereinafter, certain example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an electronic device in a network environment according to an embodiment.

FIG. 1 is a block diagram illustrating an electronic device in a network environment, according to an embodiment. Referring to FIG. 1, in an embodiment, an electronic device 101 in a network environment 100 may communicate with an electronic device 102 via a first network 198 (e.g., a short-range wireless communication network), or communicate with at least one selected from an external electronic device 104 and a server 108 via a second network 199 (e.g., a long-range wireless communication network). The electronic device 101 may communicate with the external electronic device 104 via the server 108. The electronic device 101 includes a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. At least one (e.g., the connecting terminal 178) selected from the above components may be omitted from the electronic device 101, or one or more other components may be added in the electronic device 101. Some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. As at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. The processor 120 includes a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. In an embodiment, for example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) selected from the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 includes the volatile memory 132 or the non-volatile memory 134. The non-volatile memory 134 includes an internal memory 136 and an external memory 138.

The program 140 may be stored as software in the memory 130, and includes, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. The receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control its corresponding one of the display, the hologram device, and the projector. The display module 160 may include a touch sensor adapted to sense a touch, or a pressure sensor adapted to measure an intensity of a force of the touch.

The audio module 170 may convert sound into an electric signal or vice versa. The audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a Hall sensor, or an illuminance sensor.

The interface 177 may support one or more specified protocols to be used by the electronic device 101 to couple with an external electronic device (e.g., the electronic device 102) directly (e.g., by wire) or wirelessly. The interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). The connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. The haptic module 179 may include, for example, a motor, a piezoelectric element, or an electric stimulator.

The camera module 180 may capture a still image and moving images. The camera module 180 may include one or more lenses, image sensors, ISPs, and flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the external electronic device 104, or the server 108) and performing communication via the established communication channel. The communication module 190 may include one or more CPs that are operable independently from the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device, for example, the electronic device 104, via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the external electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such an embodiment, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as or defined by a part of the antenna module 197.

The antenna module 197 may form a mmWave antenna module. The mmWave antenna module may include a PCB, an RFIC on a first surface (e.g., a bottom surface) of the PCB or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 and 104 may be a device of the same type as or a different type from the electronic device 101. All or some of operations to be executed by the electronic device 101 may be executed at one or more of (or at least one selected from) the external electronic devices 102, 104, and 108. In an embodiment, for example, if the electronic device 101 is desired to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an embodiment, for example, the external electronic device 104 may include an Internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
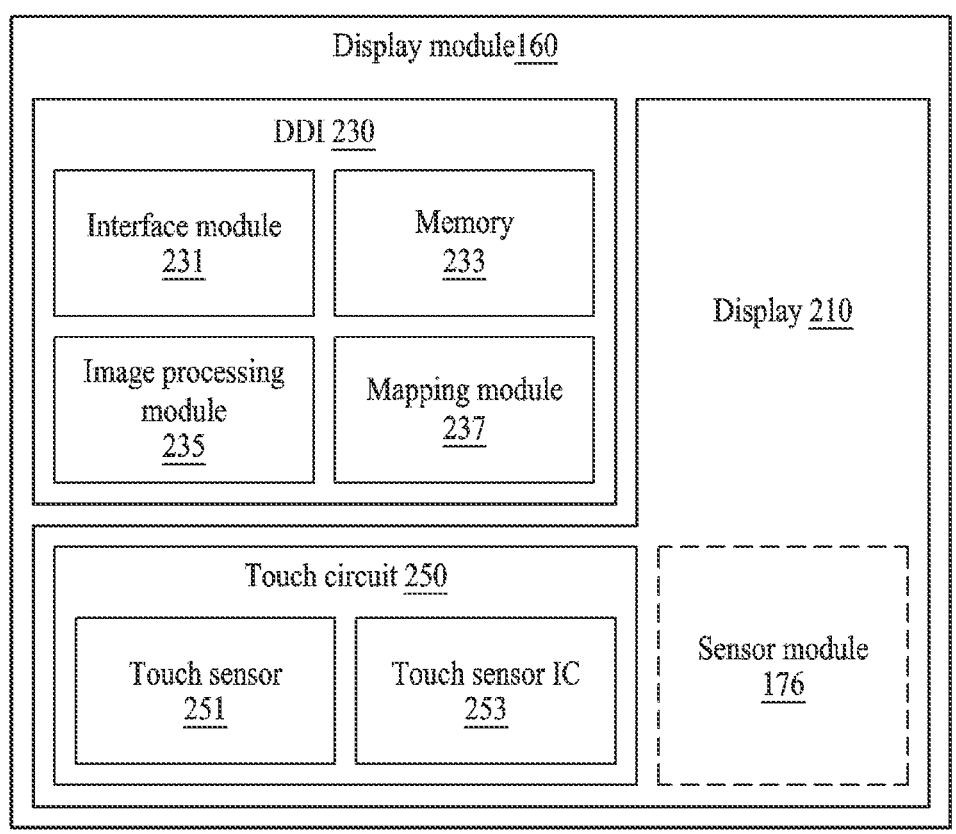
FIG. 2 is a block diagram illustrating a display module according to an embodiment.

FIG. 2 is a block diagram illustrating a display module 160 according to an embodiment. Referring to FIG. 2, the display module 160 may include a display 210 and a display driver integrated circuit (IC) (DDI) 230 for controlling the display 210. The DDI 230 may include an interface module 231, a memory 233 (e.g., a buffer memory), an image processing module 235, or a mapping module 237. The DDI 230 may receive, for example, image data or image information including an image control signal corresponding to a command for controlling the image data from another component of the electronic device 101 through the interface module 231. For example, the image information may be received from the processor 120 (e.g., the main processor 121 (e.g., an application processor)) or the auxiliary processor 123 (e.g., a graphics processing unit (GPU)) operating independently of functions of the main processor 121. The DDI 230 may communicate with a touch circuit 250 or the sensor module 176 through the interface module 231. In addition, the DDI 230 may store, in the memory 233, at least a portion of the received image information in units of frames, for example. The image processing module 235 may perform pre-processing or post-processing (e.g., resolution, brightness, or size adjustment) on the portion of the image data based on a characteristic of the image data or a characteristic of the display 210. The mapping module 237 may generate a voltage value or a current value corresponding to image data obtained through the pre-processing or post-processing by the image processing module 235. The generation of the voltage value or the current value may be performed based at least on attributes (e.g., an arrangement of pixels (e.g., red, green, blue (RGB) stripe or pentile structure), or size of each sub-pixel) of pixels of the display 210. As at least some pixels of the display 210 may operate based at least on the voltage value or the current value, visual information (e.g., text, images, or icons) corresponding to the image data may be displayed on the display 210.

The display module 160 may further include the touch circuit 250. The touch circuit 250 may include a touch sensor 251 and a touch sensor IC 253 for controlling the touch sensor 251. For example, the touch sensor IC 253 may control the touch sensor 251 to sense a touch input or a hovering input made at a specific position on the display 210. In this example, the touch sensor IC 253 may sense the touch input or the hovering input by measuring a change (e.g., voltage, light amount, resistance, or electric charge amount) in a signal at the specific position on the display 210. The touch sensor IC 253 may provide information (e.g., position, area, pressure, or time) associated with the sensed touch input or the sensed hovering input to the processor 120. At least a portion (e.g., the touch sensor IC 253) of the touch circuit 250 may be included as a portion of the DDI 230, the display 210, or another component (e.g., the auxiliary processor 123) provided outside the display module 160.

The display module 160 may further include at least one sensor (e.g., a fingerprint sensor, an iris sensor, a pressure sensor, or an illuminance sensor) of the sensor module 176, or a control circuit for controlling the sensor. According to an embodiment, the sensor or the control circuit may be embedded partially or wholly in a portion (e.g., the display 210 or the DDI 230) of the display module 160 or a portion of the touch circuit 250. For example, when the sensor module 176 embedded in the display module 160 includes a biosensor (e.g., a fingerprint sensor), the biosensor may obtain biometric information (e.g., a fingerprint image) associated with a touch input to a partial area of the display 210. For another example, when the sensor module 176 embedded in the display module 160 includes a pressure sensor, the pressure sensor may obtain pressure information associated with a touch input through a partial area or an entire area of the display 210. The touch sensor 251 or the sensor module 176 may be arranged between pixels of a pixel layer of the display 210, or above or below the pixel layer.

According to an embodiment, an electronic device described herein may be a device of one of various types. The electronic device may include, as non-limiting examples, a portable communication device (e.g., a smartphone, etc.), a computing device, a portable multimedia device, a portable medical device, a camera, a wearable device, or a home appliance. However, the electronic device is not limited to the foregoing examples.

It is to be understood that various embodiments of the present disclosure and the terms used therein are not intended to limit the technological features set forth herein to some specific embodiments but include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B, or C," "at least one of A, B, and C," and "at least one of A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in the form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method described herein may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
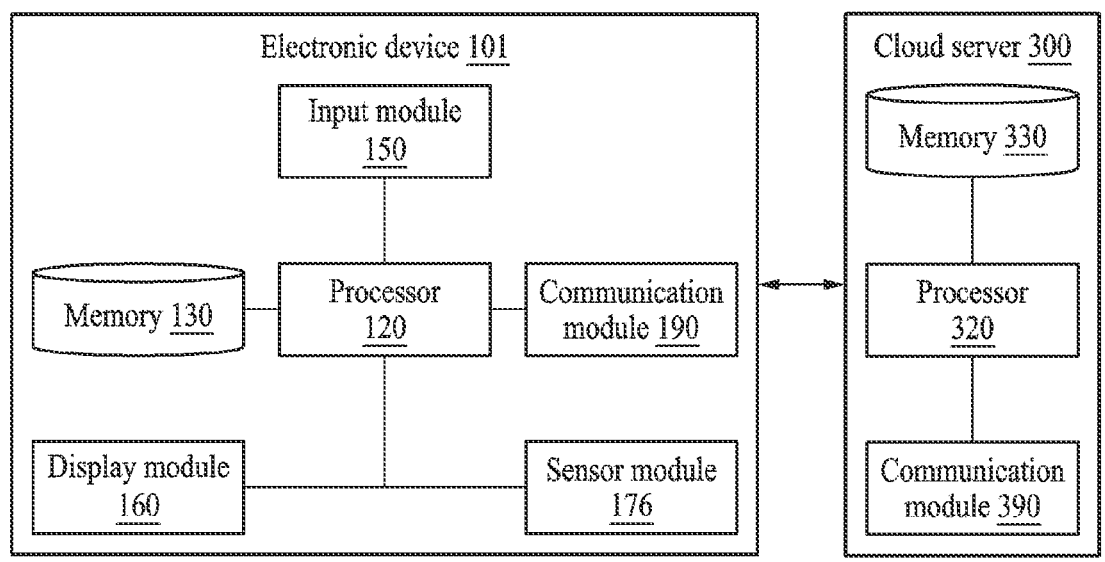
FIG. 3 is a block diagram illustrating a configuration of an electronic device and a configuration of a cloud server according to an embodiment.

FIG. 3 is a block diagram illustrating a configuration of an electronic device and a configuration of a cloud server according to an embodiment.

Referring to FIG. 3, illustrated are an electronic device 101 and a cloud server 300 performing user authentication to authenticate a user of the electronic device 101.

The electronic device 101 may include a communication module 190 that communicates with the cloud server 300, a display module 160 that displays a screen based on problem information received from the cloud server 300, a memory 130 that stores therein computer-executable commands, and a processor 120 that executes the instructions by accessing the memory 130. The electronic device 101 may include an input module 150 that receives a user input, and a sensor module 176 that obtains a touch input and information related thereto. The foregoing description of the electronic device 101, the memory 130, the processor 120, the input module 150, the communication module 190, the display module 160, and the sensor module 176 may be applicable hereto, and thus any repetitive detailed description of the same or like features thereof will be omitted here.

The instructions stored in the memory 130 of the electronic device 101 may be configured to cause the cloud server 300 to perform user authentication.

For example, the processor 120 of the electronic device 101 may transmit, to the cloud server 300, account information on which the authentication is to be performed and a request for the authentication based on login, and may then receive, from the cloud server 300, first problem information including first question information and first option information for user authentication.

The processor 120 may display the first problem information through the display module 160, and receive a result of whether the authentication is successful or not from the cloud server 300 after transmitting a user input in response to the first option information to the cloud server 300.

The cloud server 300 may include a communication module 390 that communicates with the electronic device 101 which is a client, a memory 330 that stores therein a database (DB) maintaining therein user data and stores therein computer-executable instructions, and a processor 320 that executes the instructions by accessing the memory 330. The communication module 390, the memory 330, and the processor 320 may be the same as or similar to the communication module 190, the memory 130, and the processor 120 described above with reference to FIG. 1. The memory 330 may include, for example, a volatile memory or a non-volatile memory.

The instructions stored in the memory 330 of the cloud server 300 may be configured to cause the cloud server 300 to perform user authentication by the request for the authentication from the electronic device 101.

For example, the processor 320 of the cloud server 300 may receive the account information on which the authentication is to be performed and the request for the authentication from the electronic device 101, obtain the user data corresponding to the account information from the DB maintaining the user data stored in the memory 330, and obtain authentication information for user authentication from the user data corresponding to the account information. The authentication information may include at least one of contact information, downloaded application information, call history information, text history information, image information, memo information, note information, location (e.g., global positioning system (GPS)) history information, or schedule information. The authentication information may be information generated or changed within a predetermined period.

The processor 320 may obtain correct answer data and incorrect answer data based on the authentication information, and generate the first problem information including the first question information and the first option information for user authentication based on the correct answer data and the incorrect answer data and transmit the generated first problem information to the electronic device 101.

The processor 320 may obtain the correct answer data based on information in the authentication information that is generated or changed within a predetermined period. The processor 320 may obtain the incorrect answer data through web crawling and the like according to language or region information set in the authentication information and the account information. The processor 320 may generate problem information based on information obtained based on the correct answer data and information obtained based on the incorrect answer data.

According to an embodiment, when generating the first option information included in the first problem information, the processor 320 may remove duplicate options through a data hash deduplication check, for example, or using another suitable technique for removing duplicate options.

According to an embodiment, when receiving the user input in response to the first option information from the electronic device 101, the processor 320 may determine whether the authentication is successful based on whether the user input is correct (or whether the user input corresponds to a correct answer).

For example, when the user input is incorrect (e.g., the user input corresponds to an incorrect answer), the processor 320 of the cloud server 300 may determine whether the number of times the user input is incorrect reaches a threshold number of times, and may generate second problem information with a difficulty level adjusted from that of the first problem information when the number of times the user input is incorrect is less than the threshold number of times. The processor 320 may determine whether the authentication is successful based on whether a user input in response to second option information included in the second problem information corresponds to a correct answer.

According to an embodiment, when the number of times the user input is incorrect reaches the threshold number of times, the processor 320 may determine the authentication of the account information to be unsuccessful.

According to an embodiment, when the first problem information is generated based on at least one of text history information, call history information, or connected access point (AP) history information according to the account information, the processor 320 may generate the second problem information based on image information according to the account information.

The processor 320 may generate the second problem information by, for example, increasing a ratio of the number of correct answers to the number of options in the first problem information.

Hereinafter, operations of the electronic device 101 and the cloud server 300 will be described in detail with reference to FIGS. 4 through 11.

FIGS. 4 through 8 are diagrams illustrating various examples of performing user authentication according to various embodiments.

FIGS. 4 through 8 illustrate example screens displayed on the electronic device 101. As described above with reference to FIG. 3, the processor 120 of the electronic device 101 may transmit account information and a request for authentication to the cloud server 300, and the processor 320 of the cloud server 300 may obtain authentication information for user authentication from user data corresponding to the account information and obtain correct answer data and incorrect answer data based on the authentication information.

The processor 320 of the cloud server 300 may generate first problem information including first question information and first option information for the user authentication based on the correct answer data and the incorrect answer data, and transmit the generated first problem information to the electronic device 101. FIGS. 4 through 8 illustrate example screens of the electronic device 101 on which the first problem information including the first question information and the first option information is displayed. According to an embodiment, the first question information is a text-based prompt and the first option information includes a plurality of images (see, e.g., FIGS. 4, 6) associated with the text-based prompt. According to another embodiment, the first question information is a text-based prompt and the first option information includes a plurality of text-based options (see, e.g., FIG. 5, 7, 8) associated with the text-based prompt.

Figure 4:
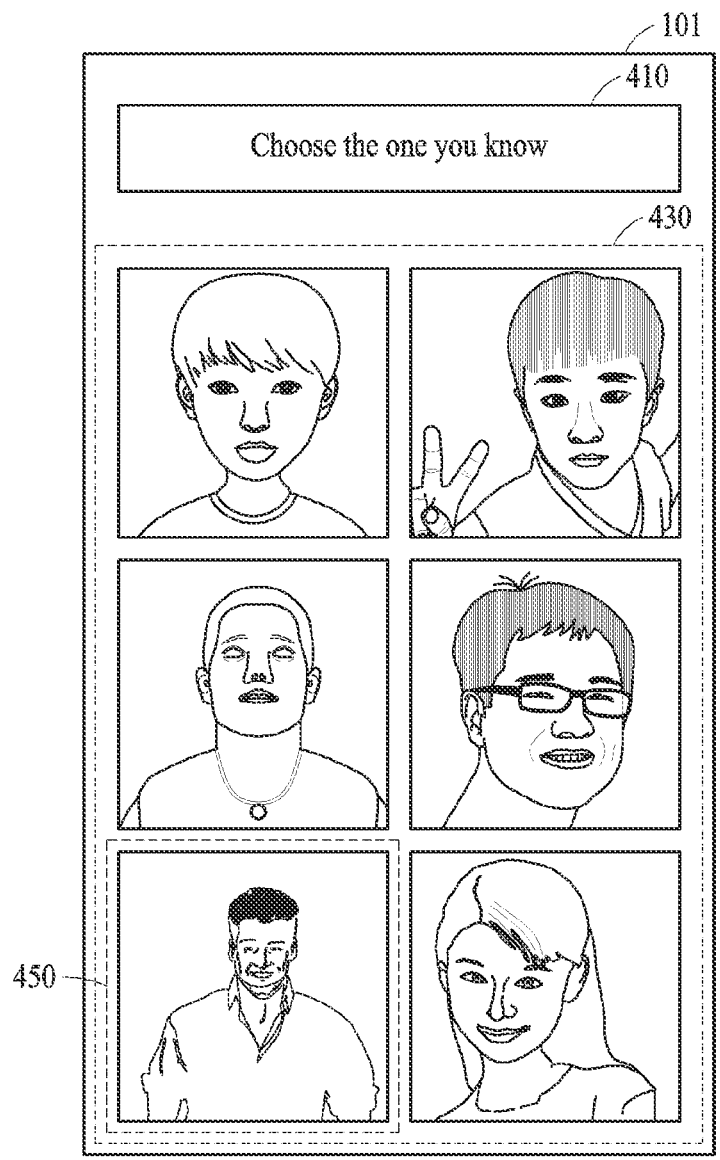
FIGS. 4 through 8 are diagrams illustrating various examples of performing user authentication according to various embodiments.

FIG. 4 illustrates an example screen of the electronic device 101 on which first problem information generated based on an image is displayed. In an embodiment described with reference to FIG. 4, the processor 320 of the cloud server 300 may obtain image information as authentication information for user authentication from user data corresponding to account information.

In the embodiment, the processor 320 of the cloud server 300 may obtain correct answer data and incorrect answer data based on the image information. For example, the image information corresponding to the account information received from the electronic device 101 may be maintained in the DB stored in the memory 330 of the cloud server 300, in which images including faces may be maintained separately. The processor 320 of the cloud server 300 may obtain, as the authentication information, the image information corresponding to the account information, and may obtain the correct answer data based on an image including a face among a plurality of images.

In the memory 330, images including faces that are classified according to the faces may be stored. For example, the images including faces may be analyzed, and analysis data in which the faces are identified may be stored along with the images in the memory 330.

For a face included more than a threshold number of times (e.g., three times), the processor 320 may obtain, as the correct answer data, a cropped image of the face, based on the analysis data. The processor 320 may obtain, as the correct answer data, the face included more than the threshold number of times and may thereby improve the quality of problem information. For example, the processor 320 may exclude, from the correct answer data, an image of a passerby that is accidentally captured.

The processor 320 may obtain the incorrect answer data based on the image information which is the authentication information. Unlike the correct answer data obtained based on personal data of a user stored in the cloud server 300, the incorrect answer data may be generated by the processor 320 of the cloud server 300 through web crawling or a generative adversarial network (GAN).

For example, the processor 320 may obtain, as the incorrect answer data, an arbitrary image including a human face based on web crawling. The processor 320 may perform web crawling based on language or region information set in the account information. For example, when the language is set to Japanese and the region is set to Japan in the account information of the user, the processor 320 may obtain, as the incorrect answer data, a face image obtained through web crawling performed based on "Japan" as a search parameter.

For another example, the processor 320 may generate a face of a non-existent person based on the GAN and obtain the generated face as the incorrect answer data. The processor 320 may obtain the incorrect answer data by using, for learning, a portion of the authentication information, e.g., a portion of the image information including a face in the user data. The processor 320 may obtain the incorrect answer data using the image information of the user and may thereby generate problem information with an increased difficulty level.

For example, referring to FIG. 4, first problem information including first question information 410 and first option information 430 corresponding to the first question information 410 is displayed on the electronic device 101. The processor 320 of the cloud server 300 may determine whether the authentication is successful based on a user input in response to the first option information 430.

For example, an option 450 in the first option information 430 may be a correct answer while the remaining options in the first option information 430 are incorrect answers. In this example, the processor 120 of the electronic device 101 may transmit the user input in response to the first option information 430 to the cloud server 300, and the processor 320 of the cloud server 300 may determine the authentication of the account information to be successful when the user selects the option 450 which is the correct answer from the first option information 430.

Figure 5:
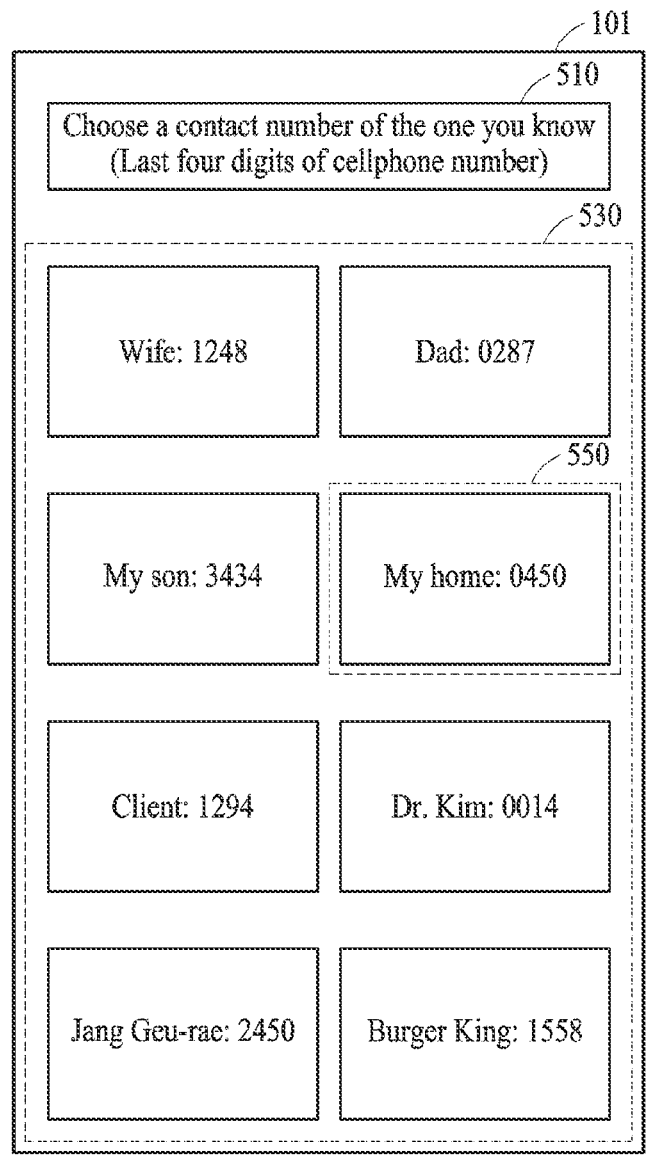

FIG. 5 illustrates an example screen of the electronic device 101 on which first problem information generated based on contact information is displayed. In an embodiment described with reference to FIG. 5, the processor 320 of the cloud server 300 may obtain contact information as authentication information for user authentication, from user data corresponding to account information.

In the embodiment, the processor 320 of the cloud server 300 may obtain correct answer data and incorrect answer data based on the contact information. For example, the contact information corresponding to the account information received from the electronic device 101 may be maintained in the DB stored in the memory 330 of the cloud server 300. The processor 320 of the cloud server 300 may obtain the contact information as the authentication information and may obtain the correct answer data based on the contact information. For example, the user may not remember old data (e.g., an old phone number of a contact), and thus the processor 320 may obtain, as the correct answer data, contact information that has been recently contacted more than a certain number of times by referring to a call history or a text history related to a contact number that has been contacted more than a certain number of times recently.

The processor 320 may obtain the incorrect answer data based on the contact information which is the authentication information. For example, referring to FIG. 5, the processor 320 may obtain the incorrect answer data by changing at least a portion of the last four digits of a cellphone number while maintaining a corresponding name in the contact information. The processor 320 may obtain the incorrect answer data by changing at least a portion of the contact information that has been contacted more than a certain number of times.

For example, referring to FIG. 5, first problem information including first question information 510 and first option information 530 corresponding to the first question information 510 is displayed on the electronic device 101. The processor 320 of the cloud server 300 may determine whether the authentication is successful based on a user input in response to the first option information 530.

For example, an option 550 in the first option information 530 may be a correct answer while the remaining options in the first option information 530 are incorrect answers. In this example, the processor 120 of the electronic device 101 may transmit the user input in response to the first option information 530 to the cloud server 300, and the processor 320 of the cloud server 300 may determine the authentication of the account information to be successful when the user selects the option 550 which is the correct answer from the first option information 530.

Figure 6:
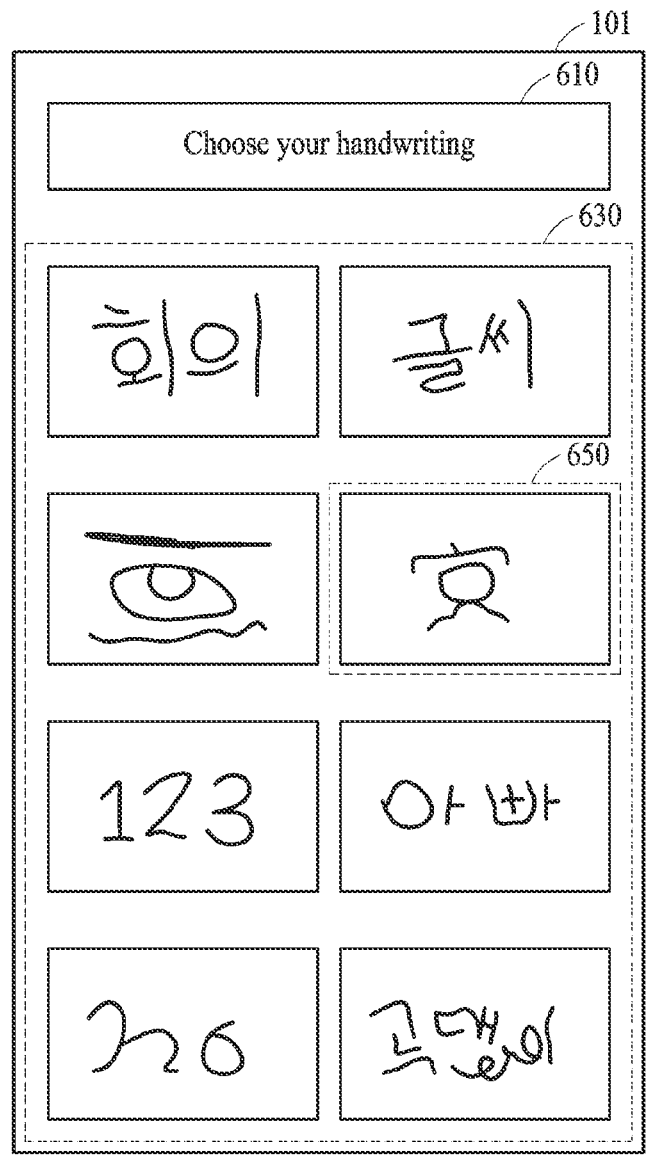

FIG. 6 illustrates an example screen of the electronic device 101 on which first problem information generated based on note information is displayed. In an embodiment described with reference to FIG. 6, the processor 320 of the cloud server 300 may obtain, as authentication information for user authentication, note information generated or changed within a predetermined period, from user data corresponding to account information.

In the embodiment, the processor 320 of the cloud server 300 may obtain correct answer data and incorrect answer data based on the note information. For example, the note information corresponding to the account information received from the electronic device 101 may be maintained in the DB stored in the memory 330 of the cloud server 300. The processor 320 of the cloud server 300 may obtain, as the authentication information, the note information generated or changed within the predetermined period, and may obtain information (e.g., handwriting) included in the note information as the correct answer data.

The processor 320 may obtain the incorrect answer data based on the note information which is the authentication information. For example, the processor 320 may obtain similar incorrect answer data to a handwriting of the user by using, for learning, a portion of the note information corresponding to the account information.

For example, referring to FIG. 6, first problem information including first question information 610 and first option information 630 corresponding to the first question information 610 is displayed on the electronic device 101. The processor 320 of the cloud server 300 may determine whether the authentication is successful based on a user input in response to the first option information 630.

For example, an option 650 in the first option information 630 may be a correct answer while the remaining options in the first option information 630 are incorrect answers. In this example, the processor 120 of the electronic device 101 may transmit the user input in response to the first option information 630 to the cloud server 300, and the processor 320 of the cloud server 300 may determine the authentication of the account information to be successful when the user selects the option 650 which is the correct answer from the first option information 630.

Figure 7:
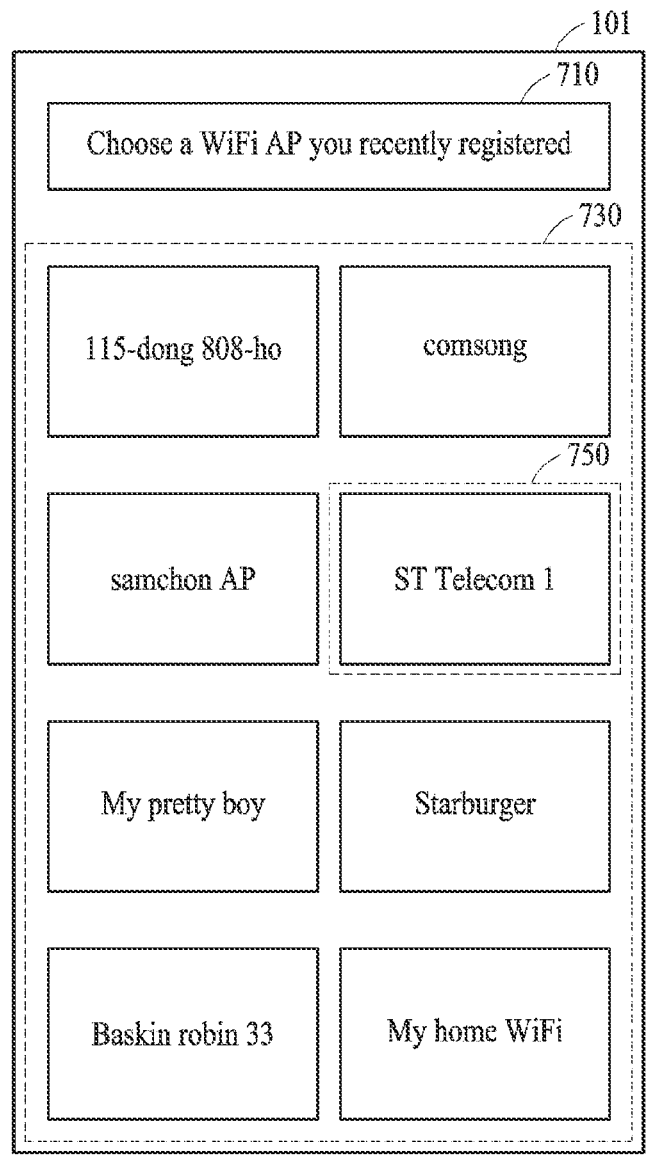

FIG. 7 illustrates an example screen of the electronic device 101 on which first problem information generated based on WiFi history information is displayed. In an embodiment described with reference to FIG. 7, the processor 320 of the cloud server 300 may obtain, as authentication information for user authentication, WiFi history information of WiFi that has been recently registered, from user data corresponding to account information.

In the embodiment, the processor 320 of the cloud server 300 may obtain correct answer data and incorrect answer data based on the WiFi history information. For example, the WiFi history information corresponding to the account information received from the electronic device 101 may be maintained in the DB stored in the memory 330 of the cloud server 300. The processor 320 of the cloud server 300 may obtain the WiFi history information as the authentication information and may obtain, as the correct answer data, information of a name of an AP that has been connected for the last week, for example.

The processor 320 may obtain the incorrect answer data based on the WiFi history information which is the authentication information. For example, the processor 320 may obtain the incorrect answer data by changing a portion of a name of an AP that has been connected by referring to the WiFi history information corresponding to the account information.

For example, referring to FIG. 7, first problem information including first question information 710 and first option information 730 corresponding to the first question information 710 is displayed on the electronic device 101. The processor 320 of the cloud server 300 may determine whether the authentication is successful based on a user input in response to the first option information 730.

For example, an option 750 in the first option information 730 may be a correct answer while the remaining options in the first option information 730 are incorrect answers. In this example, the processor 120 of the electronic device 101 may transmit the user input in response to the first option information 730 to the cloud server 300, and the processor 320 of the cloud server 300 may determine the authentication of the account information to be successful when the user selects the option 750 which is the correct answer from the first option information 730.

Figure 8:
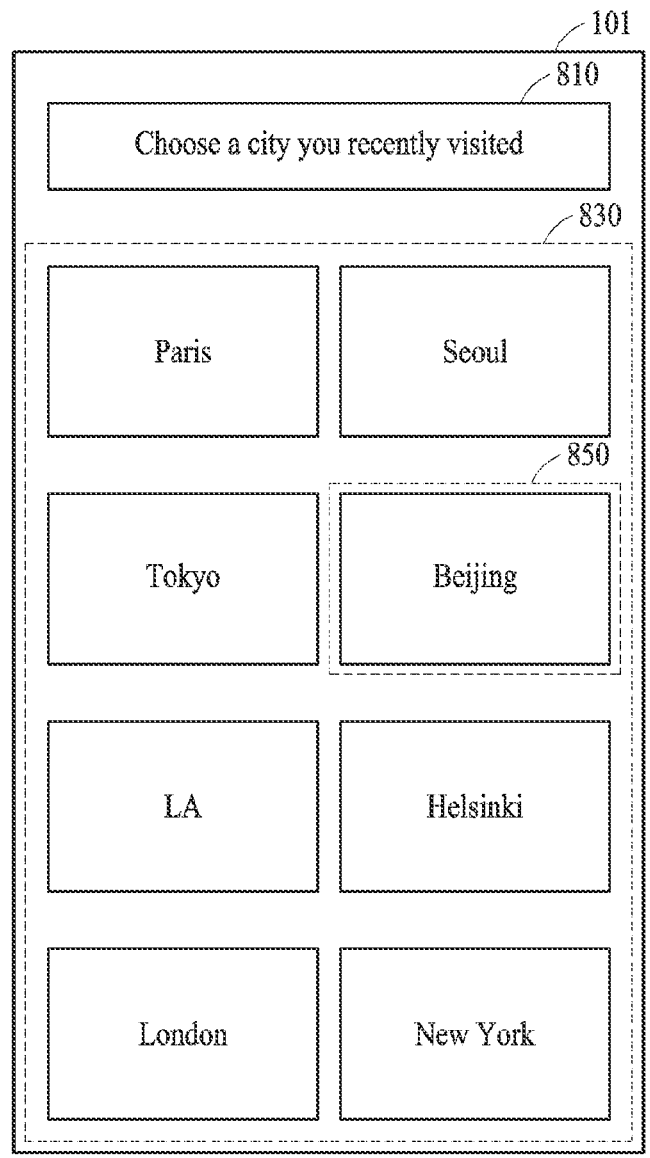

FIG. 8 illustrates an example screen of the electronic device 101 on which first problem information generated based on location history information is displayed. In an embodiment described with reference to FIG. 8, the processor 320 of the cloud server 300 may obtain recent location history information as authentication information for user authentication, from user data corresponding to account information.

In the embodiment, the processor 320 of the cloud server 300 may obtain correct answer data and incorrect answer data based on the location history information. For example, the location history information corresponding to the account information received from the electronic device 101 may be maintained in the DB stored in the memory 330 of the cloud server 300. The processor 320 of the cloud server 300 may obtain the location history information as the authentication information and may obtain, as the correct answer data, information of a region recently visited by the user corresponding to the account information based on the location history information.

The processor 320 may obtain the incorrect answer data based on the location history information which is the authentication information. For example, the processor 320 may obtain, as the incorrect answer data, information about a region that has not been visited by the user corresponding to the account information by referring to the location history information corresponding to the account information.

For example, referring to FIG. 8, first problem information including first question information 810 and first option information 830 corresponding to the first question information 810 is displayed on the electronic device 101. The processor 320 of the cloud server 300 may determine whether the authentication is successful based on a user input in response to the first option information 830.

For example, an option 850 in the first option information 830 may be a correct answer while the remaining options in the first option information 830 are incorrect answers. In this example, the processor 120 of the electronic device 101 may transmit the user input in response to the first option information 830 to the cloud server 300, and the processor 320 of the cloud server 300 may determine the authentication of the account information to be successful when the user selects the option 850 which is the correct answer from the first option information 830. The processor 320 may generate the first option information 830 based on an image. As described above with reference to FIG. 4, image information corresponding to account information may be analyzed according to various learning algorithms, and analysis data obtained by the analyzing may be stored in the cloud server 300. For example, an image of the user captured in front of a statue of Admiral Yi Sun-shin in Seoul may be stored in the cloud server 300, and "Seoul" may be included in location history information in the analysis data obtained by analyzing this image. In this example described with reference to FIG. 8, the processor 320 of the cloud server 300 may configure the first option information 830 as image data of the user by referring to the image analysis data.

Although various examples of user authentication using personal data stored in the cloud server 300 have been described above with reference to FIGS. 4 through 8, other examples may also be implemented in various ways.

In an embodiment, the processor 320 of the cloud server 300 may generate problem information based on fresh information obtained recently, such as within a certain time period (e.g., within one week). For example, referring to FIG. 5, the processor 320 may configure the question information 510 as "choose a contact number of the one you know (Last four digits of a cellphone number)." In this example, the processor 320 may obtain, as the correct answer data, a contact number the user has contacted recently and obtain, as the incorrect answer data, a contact number (or contact numbers) the user has not contacted during the certain period of time based on the contact information which is the authentication information. For another example, referring to FIG. 6, the processor 320 may configure the question information 610 as "Choose your handwriting." In this example, the processor 320 may obtain the correct answer data from a note the user recently wrote and obtain the incorrect answer data from a note the user wrote during the certain period of time, based on the note information which is the authentication information.

In an embodiment, when generating problem information, the processor 320 may configure the number of options and the number of correct answers in various ways. For example, although six options are illustrated in FIG. 4 and eight options are illustrated in FIGS. 5 through 8, the number of options is not limited to these examples, and problem information may be generated to have a greater or smaller number of options. In addition, although it is illustrated in FIGS. 4 through 8 that there is one correct answer, a plurality of correct answers may be included and whether the authentication is successful or not may be determined based on a user input.

For example, referring to FIG. 8, the question information 810 may also be configured as "Choose a city you recently visited," and there may be five correct answers among eight options in the option information 830. In this example, when three or more are selected from among the five correct answers, the processor 320 of the cloud server 300 may determine authentication of a corresponding account to be successful. In other examples, other numbers of correct answers and/or numbers of selected correct answers are possible.

In an embodiment, although the processor 320 of the cloud server 300 obtains correct answer data and incorrect answer data based on authentication information that is personal data of a user, it does not use the personal data to generate problem information and instead uses data other than personal data. In an embodiment, since the user may feel uncomfortable that their personal data is included among options displayed on the electronic device 101, the processor 320 of the cloud server 300 does not use the personal data to generate first option information in first problem information.

For example, when generating first option information as an image to generate a problem using location history information as described above with reference to FIG. 8, the processor 320 does not use personal data for the option information and instead uses data other than personal data.

For example, an image captured in Paris may be included in image information of a user corresponding to account information.

Although it is described above with reference to FIG. 8 that the image captured in Paris is included among options as correct answer data, personal data is not included as an option, in an embodiment, when it is set according to user settings that the personal data is not to be used as option information. In such a case, the processor 320 may configure an option based on an image result (e.g., an image of the Eiffel Tower) obtained by searching for Paris on the web.

In an embodiment, when a user input is incorrect (or a user input corresponds to an incorrect answer), the processor 320 may generate second problem information of which a difficulty level is adjusted to be lower (or easier) than that of first problem information. The adjusting of the difficulty level by the processor 320 of the cloud server 300 will be described in detail with reference to FIG. 10.

Figure 9:
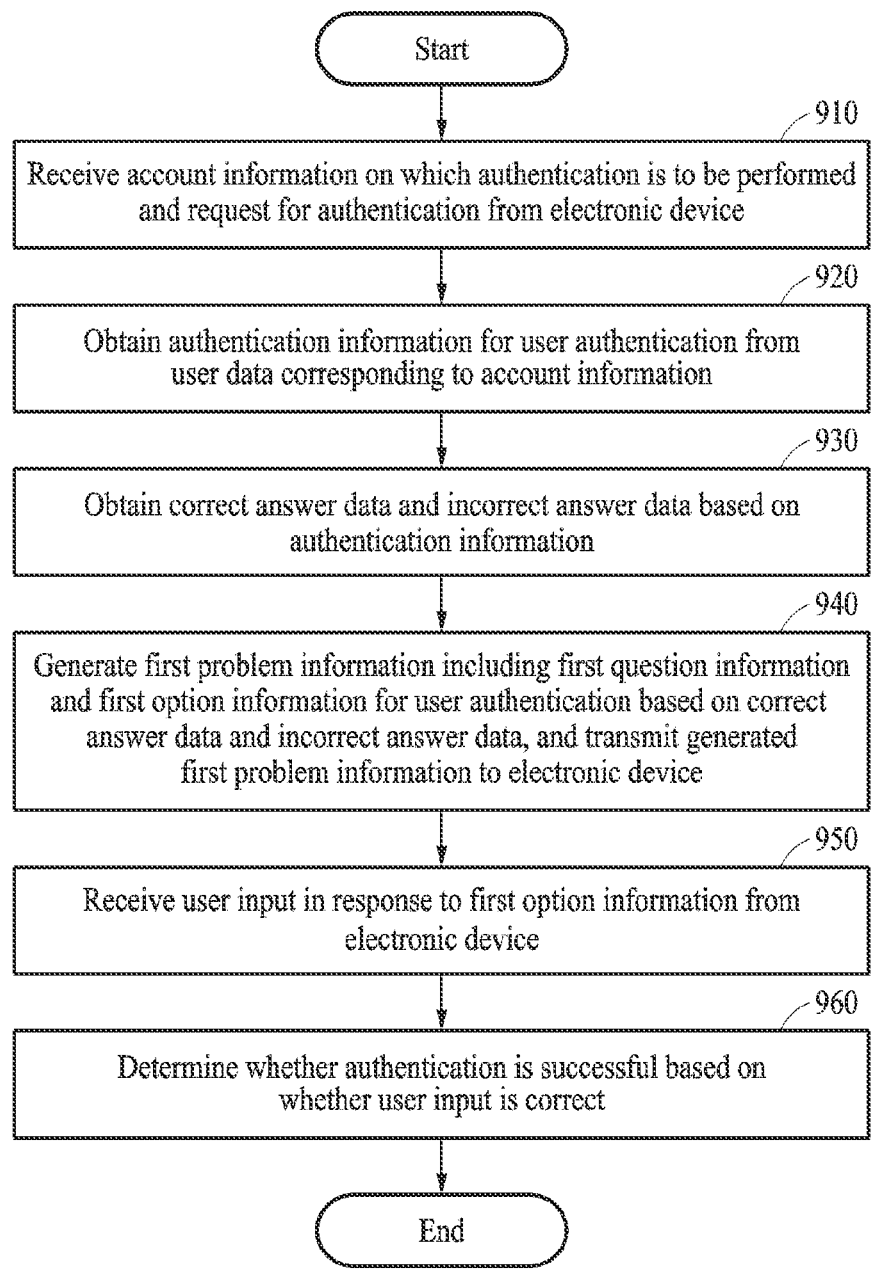
FIGS. 9 and 10 are flowcharts illustrating an operating method of a server according to an embodiment.
Figure 10:
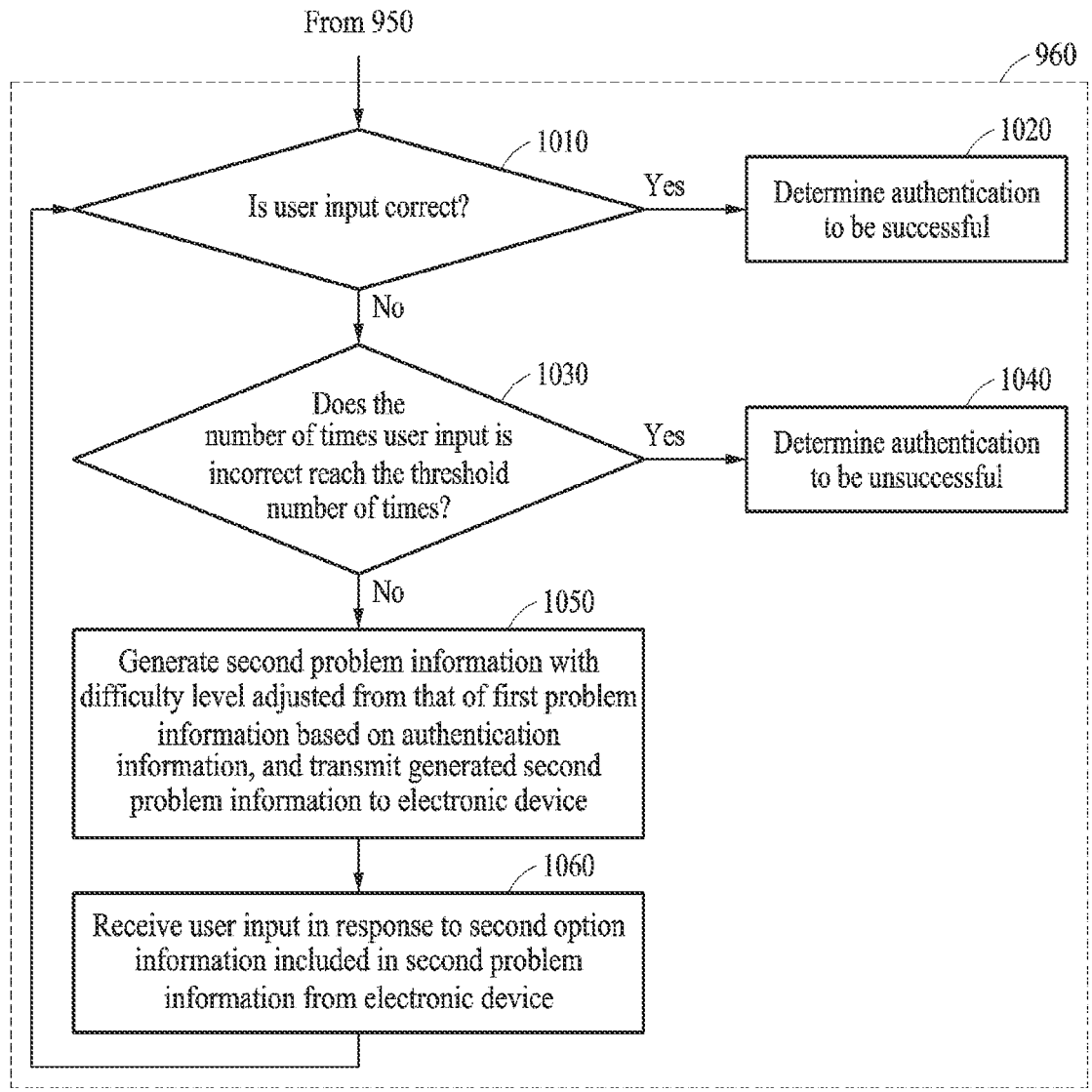

FIGS. 9 and 10 are flowcharts illustrating an operating method of a cloud server according to an embodiment.

Operations 910 through 960 to be described hereinafter with reference to FIG. 9 and operations 1010 through 1060 to be described hereinafter with reference to FIG. 10 may be performed by the processor 320 of the cloud server 300 described above with reference to FIG. 3. Other features of example embodiments described above with reference to FIGS. 1 through 8 are applicable hereto, and thus any repetitive detailed description of the same or like features will be omitted here.

In operation 910, the processor 320 may receive, from the electronic device 101, account information on which authentication is to be performed and a request for the authentication. For example, the account information may be generated when a user logs in to the electronic device 101.

In operation 920, the processor 320 may obtain authentication information for user authentication from user data corresponding to the account information. The authentication information may include at least one of contact information, downloaded application information, call history information, text history information, image information, memo information, note information, location history information, or schedule information, as described above with reference to FIGS. 4 through 8. The authentication information may be information generated or changed within a predetermined period.

In operation 930, the processor 320 may obtain correct answer data and incorrect answer data based on the authentication information. As described above with reference to FIGS. 4 through 8, the correct answer data may be obtained based on various pieces of authentication information. For example, the correct answer data may be obtained based on information that is relatively recently obtained, such as within a certain time period (e.g., within one week), among the pieces of authentication information. The incorrect answer data may be obtained through web crawling or a pre-trained model. For example, the incorrect answer data may be obtained based on information that is not recently obtained, such as not within the certain time period (e.g., one month ago), among the pieces of authentication information.

In operation 940, the processor 320 may generate first problem information including first question information and first option information for user authentication based on the correct answer data and the incorrect answer data and transmit the generated first problem information to the electronic device 101. As described above with reference to FIGS. 4 through 8, problem information including various pieces of question information and various pieces of option information may be generated.

In operation 950, the processor 320 may receive a user input in response to the first option information from the electronic device 101. In operation 960, the processor 320 may determine whether the authentication is successful based on whether the user input is correct. As described above with reference to FIGS. 4 through 8, when the user selects a correct answer from options, the processor 320 may determine that the authentication of the account information received in operation 910 is successful.

When the user input is incorrect, the processor 320 may generate second problem information with an adjusted difficulty level and transmit the generated second problem information to the electronic device 101. Hereinafter, operations to be performed when the user input is incorrect will be described in detail with reference to FIG. 10.

Operations 1010 through 1060 to be described hereinafter may correspond to an operation (e.g., operation 960 of FIG. 9) of determining, by the processor 320, whether authentication is successful based on whether a user input corresponds to a correct answer.

Referring to FIG. 10, in operation 1010, the processor 320 may determine whether the user input is correct. For example, when the user selects correct answer data or an option corresponding to the correct answer data, the processor 320 may determine the user input to be correct.

In operation 1020, when the user input is correct, the processor 320 may determine the authentication to be successful. Responsive to determining the authentication to be successful, the user may be granted access to a resource (e.g., data) that is restricted prior to the authentication being successful.

In operation 1030, when the user input is incorrect, the processor 320 may determine whether the number of times the user input is incorrect reaches a threshold number of times. For example, when the threshold number of times is five and the number of times the user input is incorrect is four, the processor 320 may perform operations 1050 and 1060.

In operation 1040, when the number of times the user input is incorrect reaches the threshold number of times, the processor 320 may determine the authentication to be unsuccessful. For example, when the threshold number of times is five and the number of times the user input is incorrect reaches five, the processor 320 may determine the authentication of the account information to be unsuccessful. In such cases, the user is not granted access to a resource (e.g., data) that is restricted.

When the number of times the user input is incorrect does not reach the threshold number of times, the processor 320 may perform operations 1050 and 1060. In operation 1050, the processor 320 may generate second problem information with a difficulty level adjusted from that of first problem information based on the authentication information and transmit the generated second problem information to the electronic device 101. For example, the processor 320 may generate the second problem information by adjusting the difficulty level of the first problem information to be lower (e.g., easier), or may generate the second problem information in various ways. As another example, the processor 320 may generate the second problem information by adjusting the difficulty level of the first problem information to be higher (e.g., harder).

For example, when the first problem information is generated based on a text, the processor 320 may adjust the difficulty level by generating the second problem information based on an image. For example, when generating the first problem information as described above with reference to FIG. 5, the processor 320 may generate the second problem information as described above with reference to FIG. 4 when the user inputs an incorrect answer. The user may more easily provide a correct answer in response to an image-based problem instead of a text-based problem.

For example, the processor 320 may adjust the difficulty level by lowering a relevance to the user when obtaining the incorrect answer data. As described above with reference to FIGS. 3 through 8, the processor 320 may refer to the authentication information which is the user data to obtain the incorrect answer data. For example, as described above with reference to FIG. 4, the processor 320 may obtain similar incorrect answer data to a person included in image information of the user by using a portion of the user image information for GAN learning. The processor 320 may lower the relevance of the incorrect answer data to the user, without using a portion of the image information of the user for GAN learning or by randomly obtaining an image of a human face through web crawling, and may thereby generate the second problem information of which difficulty is adjusted to be easier than the first problem information.

For example, the processor 320 may adjust the difficulty level by increasing a ratio of the number of correct answers to a total number of options or by lowering a criterion for the number of correct answers that determines the authentication to be successful. In this example, the processor 320 may generate the second problem information by reducing the number of options corresponding to an incorrect answer. Alternatively or additionally, the processor 320 may generate the second problem information by increasing the number of options corresponding to a correct answer. Alternatively or additionally, the processor 320 may generate the second problem information by lowering a criterion for the number of correct answers that determines the authentication to be successful. For example, in a case in which the first option information included in the first problem information includes eight options among which five options correspond to a correct answer, the processor 320 may determine the authentication to be successful when a user input includes three or more correct answers. In a case in which the user input is incorrect, and the second option information included in the second problem information includes eight options of which five options correspond to a correct answer, the processor 320 may determine the authentication to be successful when a user input includes two or more correct answers. In another example, the processor 320 may decrease a ratio of the number of correct answers to the number of options in the first problem information.

In operation 1060, the processor 320 may receive a user input in response to the second option information included in the second problem information from the electronic device 101 and return to operation 1010 to determine whether the user input is correct. Thereafter, the processor 320 may perform again operations 1010 through 1060 as described above.

According to one or more embodiments, access to restricted resources can be based on the relative difficulty of the first problem information and/or the second problem information. For example, if the first problem information is easier than the second problem information, the user may be granted a higher level of access to restricted resources (e.g., grant access to a set of restricted resources), where if the first problem information is harder than the second problem information, the user may be granted a lower level of access to the restricted resources (e.g., grant access to a subset of the set of restricted resources).

Figure 11:
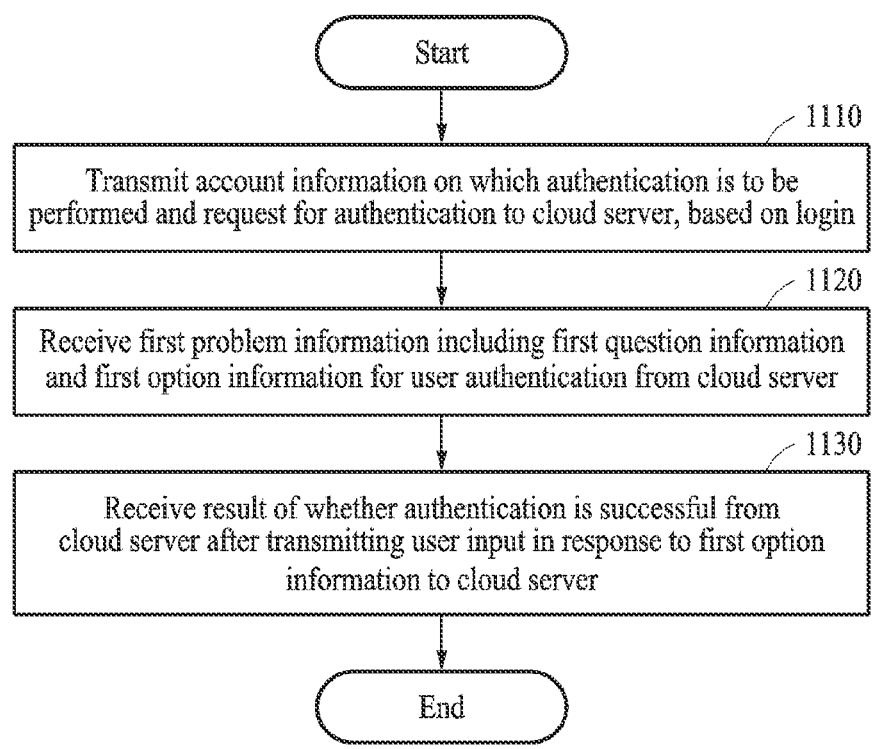
FIG. 11 is a flowchart illustrating an operating method of an electronic device according to an embodiment.

FIG. 11 is a flowchart illustrating an operating method of an electronic device according to an embodiment.

Operations 1110 through 1130 to be described hereinafter with reference to FIG. 11 may be performed by the processor 120 of the electronic device 101 described above with reference to FIG. 3. Other features of example embodiments described above with reference to FIGS. 1 through 10 are applicable hereto, and thus any repetitive detailed description of the same or like features will be omitted here.

In operation 1110, as logged in, the processor 120 may transmit, to the cloud server 300, account information on which authentication is to be performed and a request for the authentication. The cloud server 300 may obtain authentication information from user data corresponding to the account information as described above with reference to FIG. 9.

In operation 1120, the processor 120 may receive, from the cloud server 300, first problem information including first question information and first option information for user authentication. The first problem information may be generated by the cloud server 300 based on correct answer data and incorrect answer data obtained based on the authentication information, as described above with reference to FIG. 9.

In operation 1130, the processor 120 may receive a result of whether the authentication is successful from the cloud server 300 after transmitting a user input in response to the first option information to the cloud server 300. As described above with reference to FIGS. 9 and 10, the cloud server 300 may determine whether the authentication is successful based on whether the user input in response to the first option information is correct or not.

Although the operating method of the electronic device 101 that receives problem information from the cloud server 300 is described above with reference to FIG. 11, features of example embodiments are not limited thereto. For example, the electronic device 101 may receive the user data from the cloud server 300 and generate a problem for user authentication by itself. Hereinafter, an operation of receiving user data from the cloud server 300 and generating a problem by the electronic device 101 will be described. Other features of example embodiments described above with reference to FIGS. 1 through 11 are applicable hereto, and thus any repetitive detailed description of the same or like features will be omitted here.

In an embodiment, the processor 120 of the electronic device 101 may transmit, to the cloud server 300, account information on which authentication is to be performed and a request for the authentication, based on login.

The processor 120 may receive user data corresponding to the account information from the cloud server 300 and obtain authentication information for user authentication. For example, as described above with reference to FIGS. 9 and 10, the processor 320 of the cloud server 300 may obtain the user data corresponding to the account information from the DB stored in the memory 330 and transmit the user data to the electronic device 101. The processor 120 of the electronic device 101 may obtain the authentication information from the user data, and the authentication information may include various pieces of information as described above with reference to FIGS. 4 through 8.

The processor 120 may obtain correct answer data and incorrect answer data based on the authentication information, and generate first problem information including first question information and first option information for user authentication based on the correct answer data and the incorrect answer data. This operation of generating the problem information has been already described herein with reference to FIGS. 4 through 8, and a more detailed description thereof is omitted here.

The processor 120 may receive a user input in response to the first option information by displaying the first problem information, and determine whether the authentication is successful based on whether the user input is correct or not.

As described above with reference to FIG. 10, the processor 120 may determine whether the authentication is successful based on whether the number of times the user input is incorrect reaches a threshold number of times. For example, when, although the user input is an incorrect answer, the number of times the user input is incorrect does not reach the threshold number of times, the processor 120 may generate second problem information with a difficulty level adjusted to be easier than that of the first problem information, and may thereby provide the user with an opportunity again.

According to an embodiment, an operating method of the cloud server 300 may include: receiving account information on which authentication is to be performed and a request for authentication from the electronic device 101; obtaining authentication information for user authentication from user data corresponding to the account information; obtaining correct answer data and incorrect answer data based on the authentication information; generating first problem information including first question information (e.g., 410 of FIG. 4, 510 of FIG. 5, 610 of FIG. 6, 710 of FIG. 7, and 810 of FIG. 8) and first option information (e.g., 430 of FIG. 4, 530 of FIG. 5, 630 of FIG. 6, 730 of FIG. 7, and 830 of FIG. 8) for user authentication based on the correct answer data and the incorrect answer data and transmitting the first problem information to the electronic device 101; receiving a user input in response to the first option information from the electronic device 101; and determining whether the authentication is successful based on whether the user input is correct or not.

The operating method of the cloud server 300 may further include: responsive to the user input being incorrect, determining whether the number of times the user input is incorrect reaches a threshold number of times; responsive to the number of times the user input is incorrect being less than the threshold number of times, generating second problem information with a difficulty level adjusted from that of the first problem information based on the authentication information and transmitting the generated second problem information to the electronic device 101; receiving, from the electronic device 101, a user input in response to second option information included in the second problem information; and determining whether the authentication is successful based on whether the user input is correct or not.

The operating method of the cloud server 300 may further include: responsive to the number of times the user input is incorrect reaching the threshold number of times, determining the authentication of the account information to be unsuccessful.

The first problem information may be generated based on at least one of text history information, call history information, or connected AP history information according to the account information, and the second problem information may be generated based on image information according to the account information.

The second problem information may be generated by increasing a ratio of the number of correct answers to the number of options in the first problem information.

Access to a restricted resource may be based on the relative difficulty of the first problem information and the second problem information. For example, responsive to the first problem information being easier than the second problem information, the user is granted a higher level of access to the restricted resource, and/or responsive to the first problem information being harder than the second problem information, the user is granted a lower level of access to the restricted resource.

The second problem information may be generated by decreasing a ratio of the number of correct answers to the number of options in the first problem information.

The authentication information may include at least one of contact information, downloaded application information, call history information, text history information, image information, memo information, note information, location history information, or schedule information.

The correct answer data may be obtained based on information in the authentication information that is generated or changed within a predetermined period.

The incorrect answer data may be obtained according to language or region information set in the authentication information and the account information.

The first problem information may be generated based on information obtained based on the correct answer data and information obtained based on the incorrect answer data.

According to an embodiment, the server 300 for user authentication may include the communication module 390 that communicates with the electronic device 101, the memory 330 that stores therein the DB for maintaining user data and computer-executable instructions, and the processor 320 that executes the instructions by accessing the memory 330. The instructions may be configured to cause the server 300 to receive account information on which authentication is to be performed and a request for the authentication from the electronic device 101; obtain authentication information for user authentication from the user data corresponding to the account information stored in the DB; obtain correct answer data and incorrect answer data based on the authentication information; generate first problem information including first question information and first option information for user authentication based on the correct answer data and the incorrect answer data and transmit the first problem information to the electronic device 101; receive a user input in response to the first option information from the electronic device 101; and determine whether the authentication is successful based on whether the user input is correct or not.

When the user input is incorrect, the instructions may be further configured to cause the server 300 to determine whether the number of times the user input is incorrect reaches a threshold number of times; responsive to the number of times the user input is incorrect being less than the threshold number of times, generate second problem information with a difficulty level adjusted from that of the first problem information based on the authentication information and transmit the generated second problem information to the electronic device 101; receive a user input in response to second option information included in the second problem information from the electronic device 101; and determine whether the authentication is successful based on whether the user input is correct or not.

Responsive to the number of times the user input is incorrect reaching the threshold number of times, the instructions may be further configured to cause the server 300 to determine the authentication of the account information to be unsuccessful.

The first problem information may be generated based on at least one of text history information, call history information, or connected AP history information according to the account information, and the second problem information may be generated based on image information according to the account information.

The second problem information may be generated by increasing a ratio of the number of correct answers to the number of options in the first problem information.

The authentication information may include at least one of contact information, downloaded application information, call history information, text history information, image information, memo information, note information, location history information, or schedule information.

The correct answer data may be obtained based on information in the authentication information that is generated or changed within a predetermined period.

The incorrect answer data may be obtained according to language or region information set in the authentication information and the account information.

The first problem information may be generated based on information obtained based on the correct answer data and information obtained based on the incorrect answer data.

According to an embodiment, the electronic device 101 may include the communication module 190 that communicates with the cloud server 300 for user authentication, the memory 130 that stores therein computer-executable instructions, and the processor 120 that executes the instructions by accessing the memory 130. The instructions may be configured to cause the electronic device 101 to transmit, to the cloud server 300, account information on which authentication is to be performed and a request for the authentication, based on login; receive, from the cloud server 300, first problem information including first question information and first option information for user authentication; and receive a result of whether the authentication is successful from the cloud server 300 after transmitting a user input in response to the first option information to the cloud server 300.

According to an embodiment, the electronic device 101 may include the communication module 190 that communicates with the cloud server 300 for user authentication, the memory 130 that stores therein computer-executable instructions, and the processor 120 that executes the instructions by accessing the memory 130. The instructions may be configured to cause the electronic device 101 to transmit, to the cloud server 300, account information on which authentication is to be performed and a request for the authentication, based on login; obtain authentication information for user authentication by receiving user data corresponding to the account information from the cloud server 300; obtain correct answer data and incorrect answer data based on the authentication information; generate first problem information including first question information and first option information for user authentication based on the correct answer data and the incorrect answer data; receive a user input in response to the first option information by displaying the first problem information; and determine whether the authentication is successful based on whether the user input is correct or not.

While the disclosure has been shown and described with reference to certain embodiments thereof, it will be understood by those skilled in the art that various changes in form and details may be made therein without departing from the scope of the disclosure. Therefore, the scope of the disclo-

What is claimed is:

1. An operating method of a cloud server, comprising:
receiving, from an electronic device, account information on which authentication is to be performed and a request for the authentication;
obtaining authentication information for user authentication from user data corresponding to the account information;
obtaining correct answer data and incorrect answer data based on the authentication information;
generating first problem information comprising first question information and first option information for the user authentication based on the correct answer data and the incorrect answer data, and transmitting the first problem information to the electronic device;
receiving, from the electronic device, a user input in response to the first option information;
responsive to the user input corresponding to an incorrect answer, determining whether the number of times the user input is an incorrect answer reaches a threshold number of times;
responsive to the number of times the user input is an incorrect answer being less than the threshold number of times, generating second problem information with a difficulty level adjusted from that of the first problem information based on the authentication information and transmitting the generated second problem information to the electronic device;
receiving, from the electronic device, a user input in response to second option information comprised in the second problem information; and
determining whether the authentication is successful based on whether the user input corresponds to the correct answer, and
wherein the second problem information is generated by increasing or decreasing a ratio of the number of correct answers to the number of options in the first problem information.

2. The operating method of claim 1, further comprising:
responsive to the number of times the user input is an incorrect answer reaching the threshold number of times, determining the authentication of the account information to be unsuccessful.

3. The operating method of claim 1, wherein the first problem information is generated based on at least one of text history information, call history information, or connected access point (AP) history information according to the account information, and
the second problem information is generated based on image information according to the account information.

4. The operating method of claim 1, wherein access to a restricted resource is based on the relative difficulty of the first problem information and the second problem information,
wherein responsive to the first problem information being easier than the second problem information, the user is granted a higher level of access to the restricted resource, and
wherein responsive to the first problem information being harder than the second problem information, the user is granted a lower level of access to the restricted resource.

5. The operating method of claim 1, wherein the authentication information comprises at least one of contact information, downloaded application information, call history information, text history information, image information, memo information, note information, location history information, or schedule information.

6. The operating method of claim 1, wherein the correct answer data is obtained based on information in the authentication information that is generated or changed within a predetermined period.

7. The operating method of claim 1, wherein the incorrect answer data is obtained according to language or region information that is set in the authentication information and the account information.

8. The operating method of claim 1, wherein the first problem information is generated based on information obtained based on the correct answer data and information obtained based on the incorrect answer data.

9. The operating method of claim 1, wherein the first question information is a text-based prompt and wherein the first option information comprises a plurality of images associated with the text-based prompt.

10. A non-transitory computer-readable storage medium storing instructions that, when executed by a processor, cause the processor to perform the operating method of claim 1.

11. A server for user authentication, comprising:
a communication module configured to communicate with an electronic device;
a memory storing therein a database (DB) storing user data, and computer-executable instructions; and
a processor configured to execute the instructions by accessing the memory,
wherein the instructions, when executed by the processor, are configured to:
receive, from the electronic device, account information on which authentication is to be performed and a request for the authentication;
obtain authentication information for user authentication from the user data corresponding to the account information stored in the DB;
obtain correct answer data and incorrect answer data based on the authentication information;
generate first problem information comprising first question information and first option information for the user authentication based on the correct answer data and the incorrect answer data, and transmit the first problem information to the electronic device;
receive, from the electronic device, a user input in response to the first option information;
responsive to the user input corresponding to an incorrect answer, determine whether the number of times the user input is an incorrect answer reaches a threshold number of times;
responsive to the number of times the user input is an incorrect answer being less than the threshold number of times, generate second problem information with a difficulty level adjusted from that of the first problem information based on the authentication information and transmit the generated second problem information to the electronic device;
receive, from the electronic device, a user input in response to second option information comprised in the second problem information; and
determine whether the authentication is successful based on whether the user input corresponds to the correct answer, and wherein the second problem information is generated by increasing or decreasing a ratio of the number of correct answers to the number of options in the first problem information.

12. The server of claim 11, wherein the instructions are further configured to:
responsive to the number of times the user input is incorrect reaching the threshold number of times, determine the authentication for the account information to be unsuccessful.

13. The server of claim 11, wherein the first problem information is generated based on at least one of text history information, call history information, or connected access point (AP) history information according to the account information, and
the second problem information is generated based on image information according to the account information.

14. The server of claim 11, wherein the authentication information comprises at least one of contact information, downloaded application information, call history information, text history information, image information, memo information, note information, location history information, or schedule information.

15. An electronic device, comprising:
a communication module configured to communicate with a cloud server for user authentication;
a memory configured to store therein computer-executable instructions; and
a processor configured to execute the instructions by accessing the memory,
wherein the instructions, when executed by the processor, are configured to:
transmit, to the cloud server, account information on which authentication is to be performed and a request for the authentication, based on login;
obtain authentication information for user authentication by receiving user data corresponding to the account information from the cloud server;
obtain correct answer data and incorrect answer data based on the authentication information;
generate first problem information comprising first question information and first option information for the user authentication based on the correct answer data and the incorrect answer data;
receive a user input in response to the first option information by displaying the first problem information;
responsive to the user input corresponding to an incorrect answer, determine whether the number of times the user input is an incorrect answer reaches a threshold number of times;
responsive to the number of times the user input is an incorrect answer being less than the threshold number of times, generate second problem information with a difficulty level adjusted from that of the first problem information based on the authentication information;
receive a user input in response to second option information comprised in the second problem information; and
determine whether the authentication is successful based on whether the user input corresponds to the correct answer, and
wherein the second problem information is generated by increasing or decreasing a ratio of the number of correct answers to the number of options in the first problem information.

\* \* \* \* \*